United States Patent [19]

Hughes et al.

[11] Patent Number: 4,535,204
[45] Date of Patent: Aug. 13, 1985

[54] TELEPHONE DIALLING SYSTEM

[75] Inventors: John Hughes; John Mouncher, both of Bristol, England

[73] Assignee: LHW Telephone Auto Diallers Limited, London, England

[21] Appl. No.: 398,803

[22] Filed: Jul. 16, 1982

[30] Foreign Application Priority Data

Jul. 17, 1981 [GB] United Kingdom ............... 8122132

[51] Int. Cl.³ .................... H04M 1/26; H04M 1/30; H04M 1/36
[52] U.S. Cl. ................ 179/90 BD; 235/462; 235/472
[58] Field of Search .......... 179/90 BD, 90 B, 90 BB, 179/2 A, 2 CA; 235/462, 472

[56] References Cited

U.S. PATENT DOCUMENTS

| 3,735,350 | 5/1973 | Lemelson | 235/472 X |
| 3,987,278 | 10/1976 | Van Elzakker et al. | 235/462 |
| 4,042,792 | 8/1977 | Pakenham et al. | 179/90 R |
| 4,105,997 | 8/1978 | McGinn | 340/146.3 ED |
| 4,349,741 | 9/1982 | Bobart et al. | 235/462 X |

Primary Examiner—Stafford D. Schreyer
Attorney, Agent, or Firm—Burns, Doane, Swecker & Mathis

[57] ABSTRACT

A telephone dialling system uses a hand-held wand to read telephone numbers represented in bar-code form. The coded numbers are converted to electrical signals, stored and then dialed out in impulse or tone signalling form. A microprocessor implementation and its routines are described. The coded representation may be a 2-out-of-5 code or preferably a hexadecimal code provided by four bars. The hexadecimal allows the provision of characters in addition to numerals 0–9 and enables instructions and other control functions to be entered into and acted upon by the microprocessor. The telephone numbers can be provided on documents such as letterheads or directories. The instruction and control facilities can be generated from labels formed on a pad and containing the hexadecimal codes.

12 Claims, 16 Drawing Figures

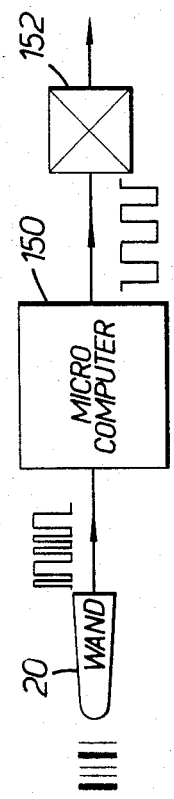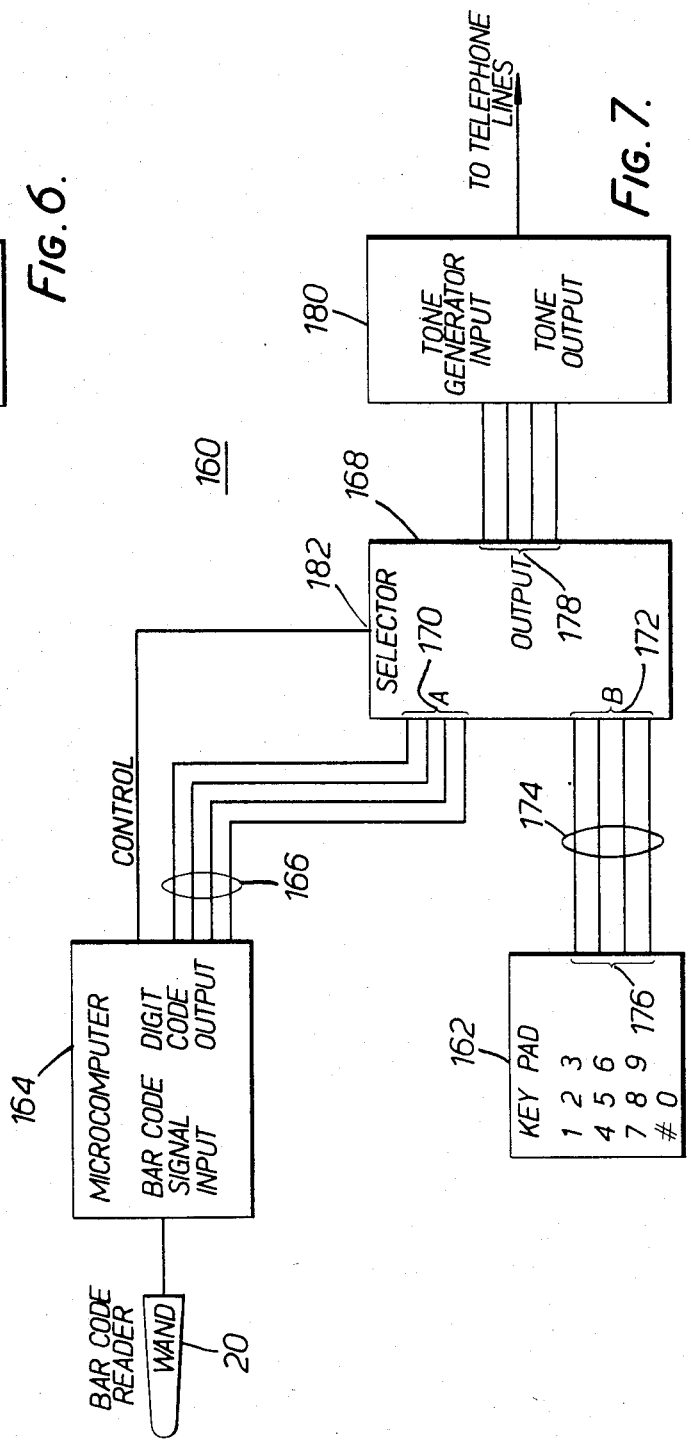

TELEPHONE DIALLING SYSTEM

FIELD OF THE INVENTION

This invention is generally concerned with the automatic dialling of telephone numbers. By "automatic" in this context is meant the facility to dial telephone numbers without the need to manipulate a dial or keypad in the conventional way.

BACKGROUND TO THE INVENTION

Numerous proposals have been made to provide a means to automatically dial telephone numbers, specifically those which are dialled frequently, without the necessity of manipulating a telephone dial or keypad. Apart from the saving of effort, in the present day, international dialling is lengthy and tedious if a number has to be repeatedly tried, and errors in dialling long telephone numbers can prove costly.

One form of automatic telephone dialler is the so-called repertory dialler in which entries of names are made on pages or an endless loop each name accompanied by a coding of the number. The device is adjusted to bring the desired name into the operative position and a sensor responds to the code to cause the number to be dialled. Examples of such devices are shown in British specification Nos. 1,290,953 (Pye TMC), 1,075,452 (G.E.C. Ltd.), 1,526,486 (Siemens) and 1,543,533 (Lane). Even using more modern technology such devices are limited in the number of numbers storable and require a pre-entry of each number that may be required to be dialled.

Other proposals have been concerned with apparatus generally intended to read telephone numbers encoded on a card or the like on which the number is represented, e.g. by punched holes or magnetically. Examples of such devices are shown in British specification Nos. 1,498,055 (Vendramini) and 1,324,448 (Harries), French specification No. 2,296,979 (Ts'ao) and German specification No. 2,817,729 (Card-O-Matic). All these devices require the user to carry about the appropriately coded card.

It has also been proposed to provide means, such as by coding against each entry in a telephone directory, whereby a hand-manipulatable sensor will read the code and this will be translated into the appropriate dialling pulses. Such a system is broadly outlined in British patent specification No. 989,112 (Siemens). A hand-manipulatable sensor element for reading an optically or magnetically coded telephone number of a support medium is described in specification No. 2,036,508 (S.I.M.E. Brondi S.p.A.). A very similar system is described in British specification No. 2,063,010 (S.T.C.) which was published on May 28, 1981. Both these latter disclosures are in highly generalized terms. Neither describes, in our opinion, a practicable implementation that would lead to consistent or accurate dialling or even discloses a practicable form of coding. Reference may also be made to German Offenlegunschrift No. 2,939,196 (Siemens) which also describes a system in which a hand-manipulatable sensor may be used to input telephone numbers represented in a form suitable for automatic character recognition. As with the two disclosures above-mentioned, there is a lack of detail as to any form of practical implementation.

It may thus be seen from the above-mentioned specifications that the desirability of some automatic system for dialling telephone numbers has been well-recognised and the subject of much activity over many years. The idea of using a hand-held device as a read-in sensor has been proposed but there is a gulf between proposing the idea and implementing it which has not so far been bridged. To our knowledge, there is no system of this kind currently available in the market place.

SUMMARY OF THE INVENTION

There will be described, hereinafter, an automatic dialling system of the invention which provides for coding telephone numbers on documents, which may be ordinary letterheads, for reading such numbers, and for providing with the aid of a microcomputer or microprocessor facilities and functions which themselves are new as well as the manner in which they are implemented. In particular the practice of the invention provides a means for handling the international and/or area codes on telephone numbers about which the prior art is entirely silent.

The present invention has been developed with regard to the fact that in certain forms of business, transactions are continually being made over the telephone requiring the frequent dialling of what are often long strings of digits. This is time consuming and liable to error on the part of the dialler. In particular where business contact is regularly and frequently made with associates, it would be convenient to be able to telephone those associates without having to manually undertake the whole dialling routine each time.

The present invention is broadly concerned with an apparatus for reading telephone numbers and controlling their automatic dialling, and with a medium, e.g. a document, bearing telephone numbers in a representation that is readable by the apparatus.

In one aspect the invention provides apparatus for reading and dialling telephone numbers comprising:
- a manually manipulatable sensor member including an optical head for scanning movement over an optical representation of a telephone number to generate corresponding electrical signals;
- a digital memory and first means responsive to said signals to enter the number in digital form and in known sequence into the memory;
- second means for reading out the figures of the number from the memory one by one in dialling order; and
- third means responsive to each figure so read out to control the generation of the dialling code pertaining to that figure.

In another aspect of the invention there is provided a document for use with apparatus of the kind specified, the document having thereon at least one entry identifying a person or firm and a marked area including a marking constituting an optical representation of the telephone number of that person or firm and at least one machine-readable marking constituting an identification of one or both ends of the telephone number.

In a still further aspect the invention provides in combination the apparatus and the document defined in which said first means includes means responsive to the end marking or markings to define the known sequence of the number as stored in the digital memory.

The implementation of the invention to be described uses an optical representation in the form of a bar code. It is to be understood that optical representation in the context of the present application includes any means of representing the telephone number so that it may be read by an optical sensor. Optical is used to include not only the visible portion of the spectrum but other portions, particularly the infrared and ultraviolet. Preferably the representation is one that is visible to the eye so that scanning may be readily effected. If the optical representation were not itself visible the marked area should include a visible marking to guide the user in scanning the representation.

It is contemplated that a bar code system may be used that is similar to bar codes used to carry information on merchandise. Such bar code systems are well established and need not be described in detail here. In using a bar code representation each figure of a telephone number may be transcribed as a set of spaced bars, e.g. a 2-out-of 5 code which gives ten possibilities, and preferably to the coded representation of the numbers is added stop and start codes identifying the respective ends of the number and enabling the reading apparatus to determine in which direction the coded representation was read. Reading may be done with the aid of a "wand" which is a standard item for use in reading bar codes.

The document of the invention may be in the form of a personal telephone book in which names can be written down and accompanied by a bar code representation of the telephone number. This may be provided by printing an adhesive label with the coded representation so that it can be stuck into the book adjacent the relevant name. The representation may of course be accompanied by its ordinary numeric version. It is also contemplated that such coded representation could also be provided on an ordinary letterhead.

While other forms of coding could be used, the bar code is presently preferred as being a well-established and reliable technique. Since bar coding is a serial digital (binary) optical coding it has the advantage of providing digital form electrical signals directly from the optical sensor for subsequent processing.

It is also desirable that the practical implementation of the system of the invention be compatible with current telephone dialling parameters. At the present time the United Kingdom employs d.c. dialling impulses on most of its network. Other countries such as the United States of America employ tone-code dialling. The invention can be put into practice with both systems.

The present invention is also concerned with further developments in the use of coded representations of telephone numbers, and particularly bar codes.

In still another aspect the present invention provides a medium bearing an optical representation of a telephone number in which the representation comprises a predetermined sequence of machine-readable markings including the following elements:

the figures of a telephone number in which each figure is represented by an element according to a code that provides for more than ten coded values; and the representation including at least one end-code in addition to said sequence and constituting an identification of one or both ends of the sequence to indicate the direction of reading of the sequence. Preferably a checksum element is also provided to enable a check for a correct reading of the telephone number.

The invention also provides in apparatus for reading and dialling telephone numbers from a medium bearing a representation as set forth in the preceding paragraph and including a checksum element, which apparatus includes an optical head for scanning movement over the representation to generate a corresponding train of electrical signals, and means including a microprocessor for processing the train of electrical signals: a microprocessor-controlled routine which includes the steps of (a) using said train of signals to generate a string of electrical elements corresponding to said optical sequence;

(b) summing the elements of the string, including the checksum element, to ascertain if the sum is equal to a predetermined value indicative of a correct reading of the sequence;

(c) using the train of signals to generate electrical representation of the end code or codes and determining the order of said string from the end code or codes;

(d) and using the elements of said string representing the telephone number to control the dialling of the number (subject to any constraints placed on such utilisation).

The use of code which has more than ten values (the previously mentioned 2-out-of-5code is limited to ten values) enables the introduction of instruction elements into the sequence that can be distinguished from figures. A preferred code is hexadecimal the values A to F (to use conventional notation) of which can be used for instructions, assuming the values 0 to 9 are allotted to the like figures. Hexadecimal coding can be implemented by making each element a four-bit bar code. A checksum element is introduced. It is presently preferred to use two end codes and to make them of a different format, i.e. not hexadecimally coded. In this case using the apparatus of the invention the sum of the elements of the sequence, including the checksum element, is compared to a predetermined value which would be stored in the apparatus. Conveniently this value is zero the summing of the elements being done modulo 16.

If the end code codes were hexadecimal and were included in the summation, then clearly the sum chosen for the sequence would be determined in relation to the value of the end code or codes.

Following the adoption of a coding having more than ten values, the sequence may include, but does not have to include, at a predetermined position in the sequence a further element in the code adopted, that has a value not allotted to represent the values of any figure of a telephone number. Such a further element may represent an instruction with regard to the telephone number and may be supplemented by a second further element which is in a predetermined position with respect to the first to extend the range of commands available. This second further element may take any value in the coding range since it is distinguishable from the telephone number by its position relative to the first further element.

To take account of the possible presence of an instruction element, the apparatus may be adapted to include in the aforementioned routine after step (c), the step of ascertaining, with the aid of the order determination on the sequence, at the appropriate predetermined position in the string, the presence of an instruction element, and performing an operation in accord with the value of that element. Such operation may include a decision not to proceed with step (d)—dialling. The following number may be stored in the microprocessor memory for other purposes.

It is also contemplated that instructions can be given to the apparatus by means of scanning representations that do not include a telephone number. In some cases they may not include may figure at all, or, for example, a single figure may be included relating to an internal operation in the microprocessor. A portion of the representation, i.e. a position in the sequence, is allotted for figures and may be termed the "digit field". A digit field is present dependent on the instruction given. In the case of ordinary dialling of a number, where no instruction element is present, the digit field contains the number.

In another aspect of the invention, there is provided a medium bearing optically-represented, machine-readable markings including elements each of which is coded in accord with a code that provides for more than ten coded values and at least one end code constituting an identification of one or both ends of said sequence, wherein said sequence comprises:
(1) preferably, though not essentially, a checksum element for providing a check of the correct reading of the sequence any one or more of the following elements or element groups:
(2) an instruction element in a predetermined position in the sequence having a value that is not allotted to any figures of a telephone number;
(3) a digit field having a predetermined position in the sequence and comprising at least one figure-representing element.

The invention also provides in apparatus for reading and dialling telephone numbers which apparatus includes an optical head for scanning movement over the markings on a medium of the kind set forth in the preceding paragraph to generate a corresponding train of electrical signals, and means including a microprocessor for processing the train of electrical signals; a microprocessor-controlled routine which includes the steps of (a) using said train of signals to generate a string of electrical elements corresponding to said sequence of optically-represented elements;
(b) if a checksum element is present, summing the elements of said string including the checksum element, to ascertain if the sum is equal to a predetermined value indicative of the correct reading of the sequence;
(c) using the train of signals to generate electrical representation of the end code or codes and determining the order of said string from the end code or codes; and
(d) examining a predetermfined position of said string to ascertain the presence of an instruction element and, if present, following a branch of the routine in accord with that instruction; or
(e) if no instruction element is present, reading the figures from said digit field as a telephone number for dialling (subject to any constraints placed on utilization of the number).

It will also be described hereinafter how bar-codes can be printed relatively easily on labels or other media on which representations are required. In a still further aspect of the invention there is provided apparatus for producing optically-represented, machine-readable markings in a bar-code form comprising a printer having a print-head and support means for a printing medium arranged for relative movement between the medium and the print-head; an entry device for inputting characters to be bar coded, and an interface device connected between the entry device and the print-head to control the latter and the relative movement with respect to the printing medium so as to cause the printing of parallel lines constituting the bar-code representation of each input character.

The invention and its practice will be further described with reference to the accompanying drawings which illustrate embodiments of the invention.

BRIEF DESCRIPTION OF THE FIGURES

FIG. 5 is a flow chart relating to the generation of dialling signals from the number read-in.

FIG. 6 is a general block diagram showing one implementation of the system with the aid of a microcomputer for impulse dialling.

FIG. 7 is a general block diagram showing another implementation of the system with the aid of a microcomputer for tone dialling.

DESCRIPTION OF THE EMBODIMENTS

In referring to examples of telephone numbers in the following description, the examples are taken from the United Kingdom telephone system.

Figure 1:
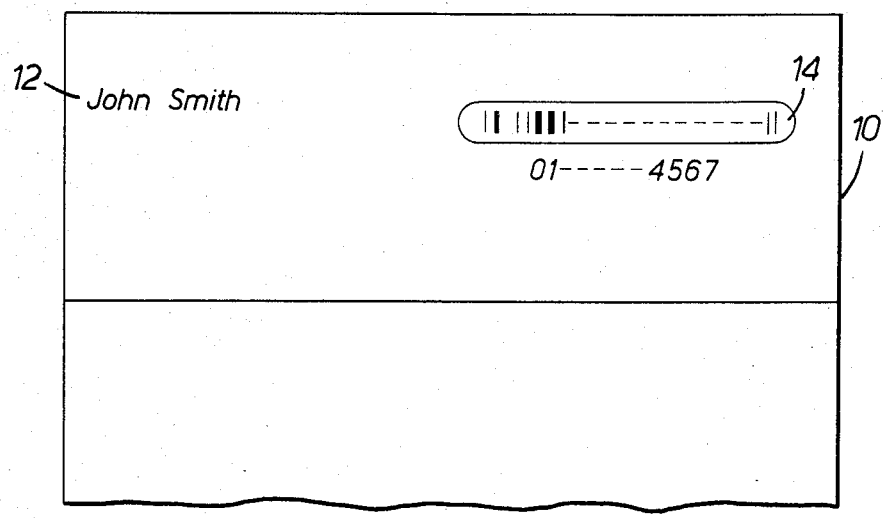
FIG. 1 shows a portion of a document bearing a bar-coded telephone number.

Referring to FIG. 1, a document 10 may simply be a page from a book for recording telephone numbers. Names such as the one shown at 12 are written at the left-hand side and a self-adhesive label 14 bearing the relevant telephone number in bar code form is stuck on the page at the right of the name. The number may be written adjacent the coded version. It will be assumed in the following description that the number is of the "all-figure" type or, if not, is expressed in its numeric equivalent.

Figure 2:
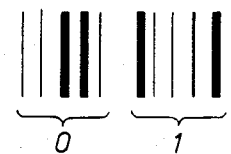
FIG. 2 is a portion of a bar coded number in 2-out-of-5 format.

FIG. 2 shows an example of a portion of a bar code. As already mentioned, it is preferred to use a standard bar coding that has been established in merchandising and the coding will only be described to the extent necessary to understand the system of the present invention and its operation. The bar code used is a 2-out-of-5 binary code in which each figure is represented by a five bit code, two positions in which are "1"s and the other three of which are "0"s. This coding gives ten possibilities, thus covering the figures 0 through 9. For example, in the usual coding convention the figure zero (0) is represented by binary code "00110" and the figure one (1) by "10001". The codes are printed sequentially, binary 0 and binary 1 being represented by a thin bar and thick bar respectively. In addition each complete code sequence is preceded by a start code and followed by a stop code. These are conventionally "01" and "00" respectively in binary form.

FIG. 2 shows a bar coding according to the above convention of a number starting with the figures 01. The binary digits are black bars on a contrasting white background. Thus for each number to be stored in the book a label is prepared having thereon a code of the kind shown in FIG. 2.

The code is read by a hand-held sensor or wand as it is commonly called. The wand contains an optical head including a light source such as a light-emitting diode and a photo-diode which responds to reflected light and which, when scanned over a code sequence such as shown in FIG. 2, produces a corresponding electrical signal in the form of pulses having a first level for the spaces between bars and a second level for the bars themselves. Each pulse duration depends on bar thickness. One feature of this pulse signal is that it is produced at a rate dependent upon the rate the wand is scanned across the code sequence. This is to be taken into account as is discussed below.

It will be understood that bar code versions of telephone numbers can appear on other documents such as company letterheads and the like, thereby enabling telephone numbers to be read directly from the document to initiate automatic dialling of the number by means of the apparatus now to be described.

Figure 3:
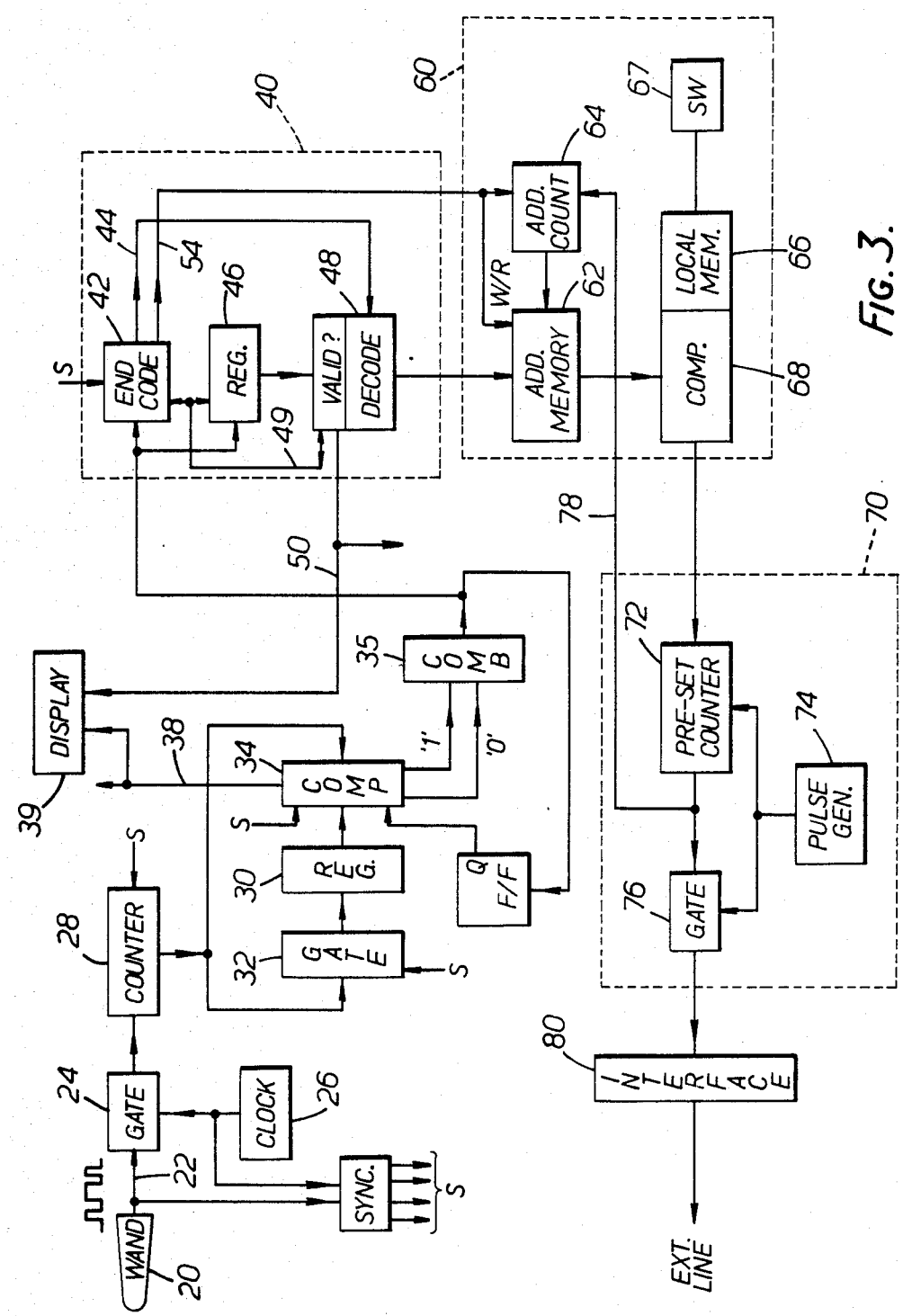
FIG. 3 is a block diagram of a system showing the functional units to be provided in reading such a bar-coded number and generating dialling code in accordance therewith.

FIG. 3 shows the main functional units of a system which it is preferred shall be implemented with a microprocessor. Numerous microprocessor or microcomputer integrated circuit devices are now available in the market place and the system description given herein is intended to provide the required guidance to the routines required for programming a given device. Examples of scanning and dialling routines will be given with reference to FIGS. 4 and 5.

In FIG. 3 the manually-operable wand 20 is scanned over the bar-coded number to be read. The wand produces a train of pulses on line 22 of longer or shorter duration depending on the thickness of the bar being scanned at any moment. The wand pulses are applied to a gate 24 controlling the supply of clock pulses from a clock source 26 to a counter 28 by which each wand pulse duration is translated to a digital count value. The first wand pulse detector is assumed to have a bit value of 0 and it will be noted that the end codes mentioned above will provide a 0 as the first pulse from whichever end of the number the scanning is started. The first wand pulse is sensed and the corresponding count value transferred into a register 30 through a gate 32 to act as a reference by which decisions are made by a comparator 34 as to whether the succeeding wand pulses represent 0s or 1s. This enables the system to accommodate itself to the speed of scan of the wand as will be explained. The comparator 34 is shown as having separate outputs for "0" and "1" decisions which are taken to combining logic 35 to provide a single series of standardized bits whose levels represent the "0" and "1" decisions of the comparator. The pulses from logic 35 are applied to a latch or flip-flop device 36 which is set or reset in accord with these pulses and signals (flags) back to the comparator whether the decision last made on the count value currently in register 30 was "1" or "0".

The first count value is entered to register 30 and the comparator forces a "0" output, ie. the first count value is taken to represent a 0 in accordance with the above assumption that the first bit value is 0. That "0" decision is signalled back to the comparator by latch 36 so that the first count value in register 30 is used as a "0" representing value for comparing with the next count value applied directly to comparator 34 from counter 28. After each comparison, every succeeding count value is written into register 30 to act as a reference for the next count value, the comparator 34 being told by the latch 36 whether to treat the reference value as a "0" or "1" in accord with the previous decision made by the comparator. In this way the comparison reference is updated during the scan to adjust for variations in scan speed.

Upon detection of the second pulse of the end code and its conversion to a digital count value, the comparator will generate a "0" or "1" indication at its output to indicate that the number is being read in forward or reverse sequence respectively. In the figure these outputs are shown as separate. If the comparator, which is pre-set to establish limits on allowed count values, finds a count value outside the allowed limits it generates a non-valid data signal on line 38 which is used as an instruction to the processing circuitry not to act on further data and is applied elsewhere in the circuitry so that the scan is ignored. The same signal may be used to activate a display 39 for the benefit of the user.

The standardised bits from combiner 35 following the comparator 34 are sent to a decoder 40. The decoder includes an end code detector 42 which on receipt of an end code sets the state of a line 44 to indicate the direction of scan—forward for "01", reverse for "00". The following bits representing the numbers are received from the comparator. The decoder 40 further includes a register 46 which stores each group of five successive bits received and a unit 48 responsive to the five bits and the direction-indicating signal on line 44 to produce a respective digital word (byte) allotted to the figure represented by each group of five bits. The detector 42 and unit 48 are interconnected as indicated by line 49 to ensure that a sole decision is reached as to whether the bits read in are end code or represent figures. The unit 48 includes facilities for indicating invalid data on line 50 to activate display 39 if any group of five bits is not in the appropriate 2-out-of-5 format. The invalid data signal is also applied to cause the scan to be ignored. Decoders for bar codes are known in the art and need be described no further.

The bar-code reading and decoding are controlled by signals generally indicated as S. These are generated by unit 52 from the clock signals in the required sequence and are synchronized to the input pulses received on line 22.

The number-representing bytes are stored in a number storing and recalling system 60. The system has an addressable memory 62. The memory is controlled by an address counter or selector 64. The memory can be controlled such that the figure-representing bytes are either assembled in the correct order for a fixed order read-out or the bytes are stored in fixed order as received and the order of read-out is made dependent on the direction signal on line 44.

The end code detector on sensing the correct final end code provides a signal on line 54 which enables the dialling sequence read-out to commence. The address counter is activated to read-out the memory locations sequentially into an encoder 70 which in response to each byte generates the dialling impulses corresponding to each figure of the number as will be described. These signals are applied through an interface circuit 80 which ensures compatibility with the telephone line requirements.

A further feature of the system 60 is the provision of means for discarding unrequired figures of the stored number. For example, in London the seven digit telephone numbers are prefixed by 01- when dialled from outside the London area but these figures have to be discarded for dialling within the London area. A document bearing the bar coded number would normally include the "01" prefix and so this would be in store in memory 62. To avoid dialling of the area prefix, the decoder is provided with a local prefix memory unit 66 into which the bytes representing initial figures of a number (say three) are entered and a comparator 68 in which these stored figures are compared with the data stored in the local memory 66. If the initial figures are the same as in the local memory they are discarded and not transmitted to the encoder. The local memory can be set up by means of switches 67 or in any other way such that the apparatus can readily be set up by the user for the area in which it is in use.

For a dialling impulse telephone network as used in the U.K., the encoder 70 is activated in response to the final end code signal on line 54 and includes a pre-settable counter 72 which is pre-set for the number of pulses to be dialled in accord with each figure supplied from system 60; a pulse generator 74 in accord with the required network parameters and a gate 76 through which the pulses are transmitted and controlled by the counter 72 which counts down the generator pulses from the preset value. The counter control signal on line 78 is also sent to the encoder 60 to call out the next figure-representing byte.

The functions carried out by the apparatus described above can largely be realised with a microcomputer, that is a CPU device together with any additional clock, counter or memory devices that may be required in addition to its own "on-chip" facilities. It can, of course, be visualized that a dedicated chip could be provided for the functions required.

Figure 4:
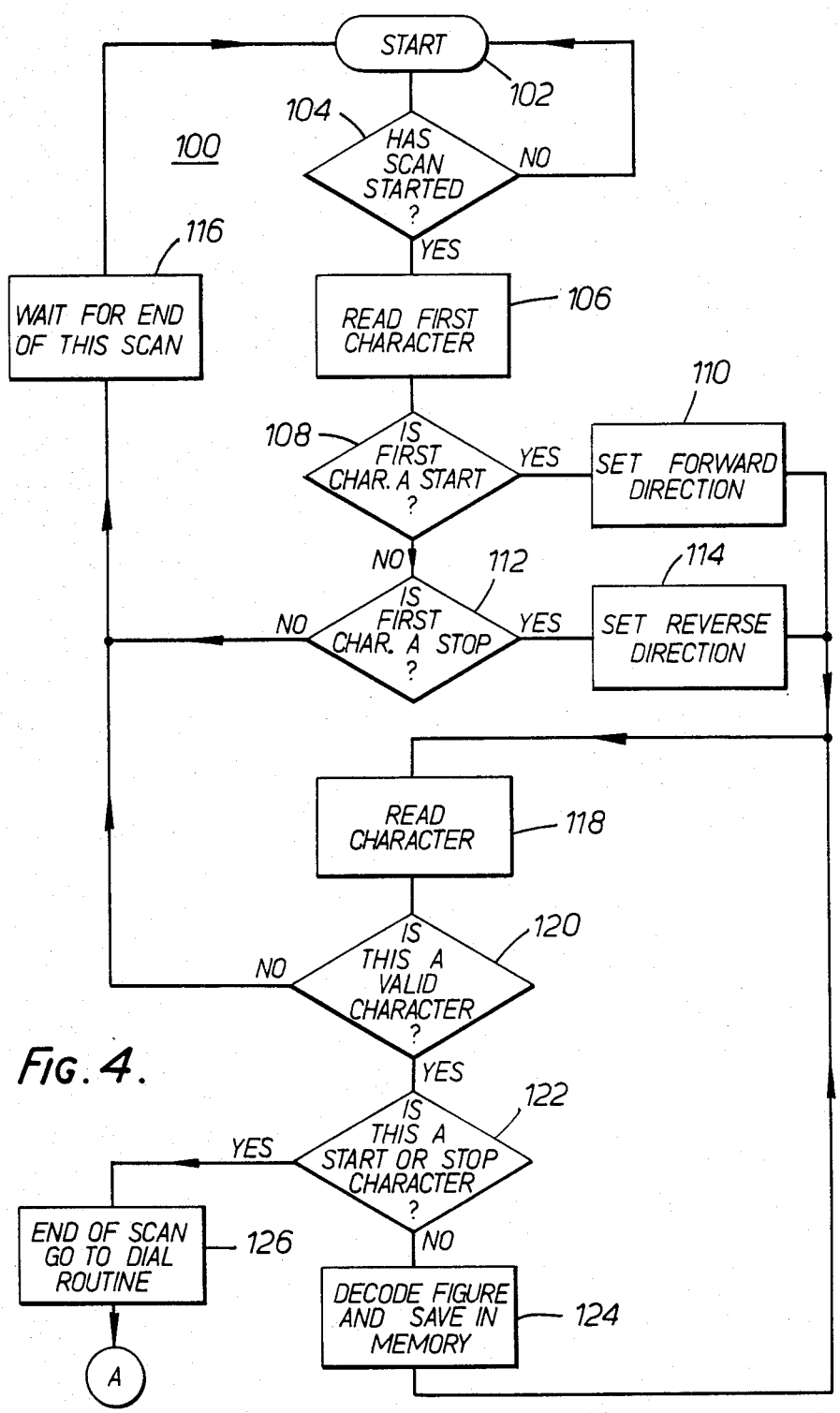
FIG. 4 is a flow chart relating to the reading-in of numbers.
Figure 5:
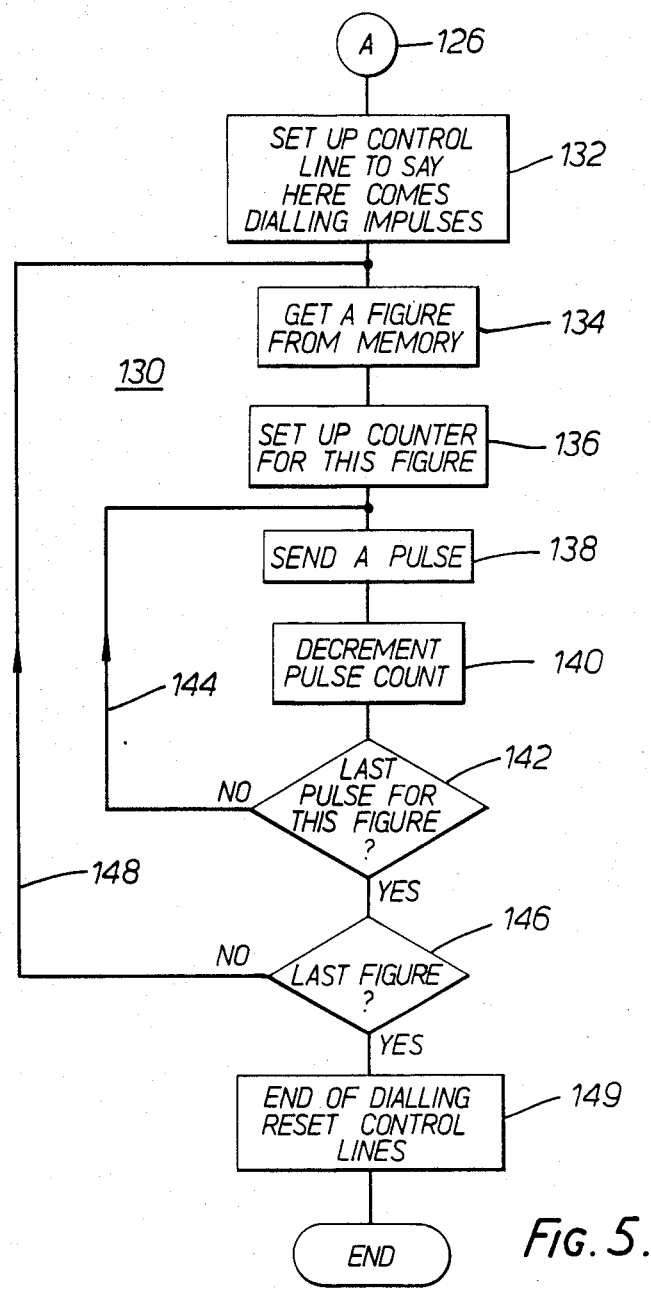

Reference will now be made to FIGS. 4 and 5 which show a routine associated with the decoding of the bar code bits and the generating of dialling signals respectively, i.e. the functions primarily performed by decoder 40 and encoder 70 in FIG. 3.

The scan routine 100 shown in FIG. 4 shows a waiting loop of steps 102 and 104 which is continually cycling until the serial bits derived from the bar code are received. Upon detection of an input bit, the first character (set of bar code bits) which should be an end code is read-in and stored at step 106. The character is then tested at step 108 to see if it is a start end code, indicating the number is being scanned in the forward direction. If so, a forward direction indicator or flat 110 is set. If the first character is not recognized as a start code, the flag 110 is not set and the code is tested at step 112 to see if it is a stop end code. If the latter is recognized a reverse direction flag 114 is set. If the character has not been recognized as a start or stop end code, i.e. not a valid code as has already been discussed, a "wait for end of scan instruction" is generated at step 116 to interrupt the input scan so that the remainder of the scan is ignored.

Assuming that a valid start or stop character is identified with the relevant flag 110 or 114 set, the next character (which should be a set of five figure-representing bits) is entered and stored at step 118 the character bits being correctly oriented in the store in dependence on the reaction flag. The character is verified at step 120, i.e., a correct 2-out-of-5 format, or a start or stop character, and if the character is invalid the wait instruction 116 is again generated. Assuming the character is verified it is checked at step 122 to see if it is a start or stop character, which will eventually appear when a scan is properly completed. A figure-representing character prior to that will pass to a decoding step 124 at where it is converted to a word or byte for storing in the addressable memory 62 of FIG. 3. The storage of a character in the memory is signalled back to step 118 to indicate the next character may be entered for decoding. After all the figure characters have been decoded, an end code—start or stop—will be received and recognized at check 122 to indicate the end of the scan with all characters stored in the memory. A dialling routine indicator or flag 126 is then set.

The dialling routine 130 is illustrated in FIG. 5 for an impulse dialling telephone system. The dialling routine commences upon receipt of the dialling routine flag 126. The first step 132 is to set up such conditions as need to be implemented to place dialling impulses on the telephone line. This is done with the aid of the interface circuit 80 of FIG. 3. The next step 134 is to call the byte representing the first figure to be dialled from the memory 62. As discussed above, this will be the fist figure of the telephone number having discarded if necesssary any area prefix figures. The byte representing the figure is set up—step 136—as a corresponding count value in a counter, e.g. 72 in FIG. 3. A dialling pulse generator (e.g. 74, 76) whose parameters are in accord with the telephone network requirements, is activated at step 138 to place the first pulse on the external line via the interface. At the same time, the counter is decremented by one (1)—step 140. Provided the counter is not at zero a decision 142 is made to continue with the next dialling impulse as indicated by loop 144, and this procedure is repeated until zero count is detected. Thereupon a decision 146 is made as to whether there are any further bytes in the memory to be dialled. If so, the routine calls up the next byte for dialling as indicated by loop 148. When the last figure has been fetched and dialled this is signalled at 149 to end the dialling procedure and wait a response to the automatically made call.

Figure 8:
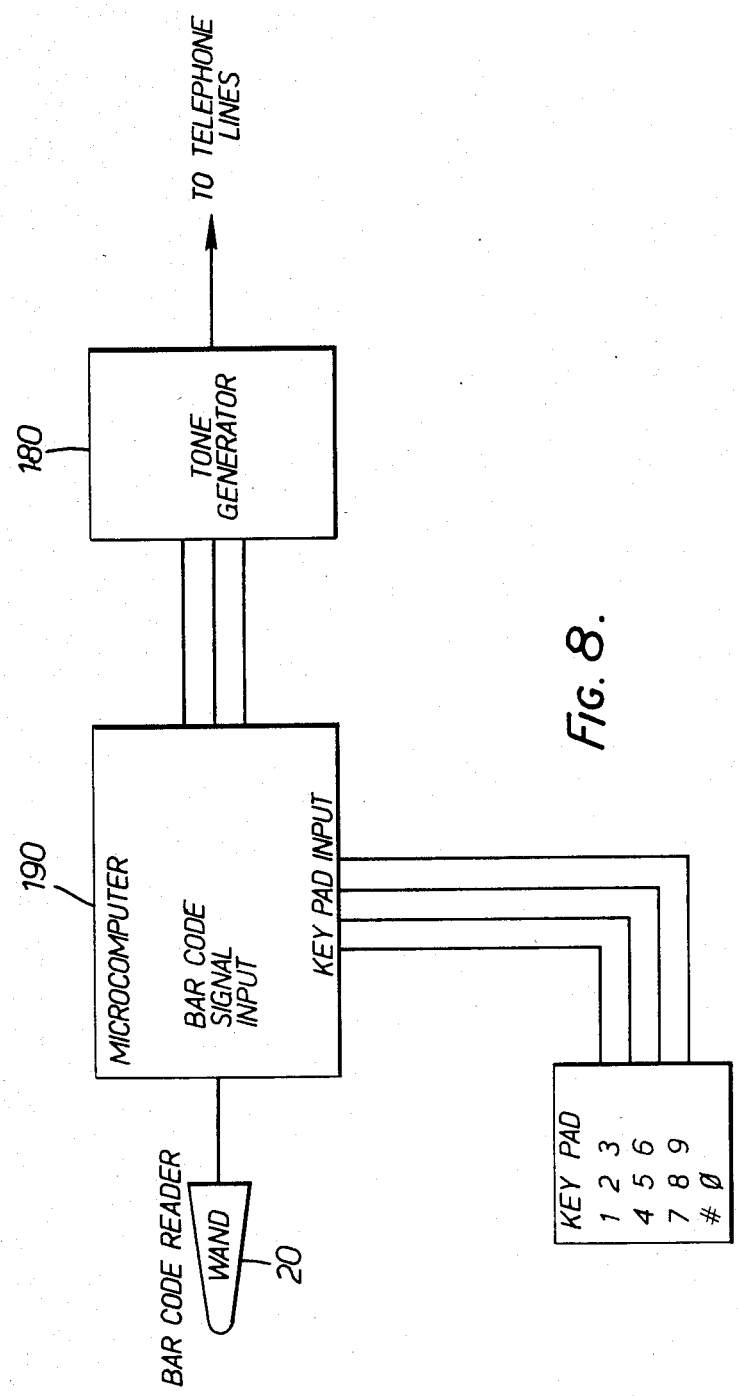
FIG. 8 is a block diagram of a modified tone-dialling apparatus.

FIGS. 6 to 8 show in general form arrangements of apparatus of the invention implemented with the aid of a microprocessor.

In FIG. 6 the code-scanning wand 20 supplies the bar code pulse train to the microprocessor-based converter 150 which outputs dialling impulses to drive a standard d.c. signalling relay 152 that is in circuit with the telephone line to generate the required impulses on the line.

FIG. 7 shows an arrangement 160 for tone dialling, with a telephone having a manual keypad 162 for normal dialling. In the arrangement of FIG. 7, the wand 20 is again connected to a microprocessor 164 which in this case sends a digital word (byte) representing a number to be dialled on lines 166 to one 4-terminal input 170 of a selector device 168. The device has a second 4-terminal input 172 connected in conventional fashion over lines 174 to the output 176 of the key pad 162. The selector has a 4-terminal output 178 connected to transmit a byte present at input 172 or 174 to the input of a tone-generator device 180 which generates tones, for application to the external line. The selector device has a control input 182 the state of which (1 or 0) selects which input is connected to the tone generator. The control input is connected to the microprocessor 164 which normally holds the control input in the state connecting input 174 to the tone generator so that normal dialling is effected via the keypad. However, on detection of signals from wand 20, the control input state is changed to allow automatic dialling from the scanned bar code.

The selector device 168 and tone generator 180 are standard items available as integrated circuits. For example, devices 168 and 180 may be types SN 74157 and ICM 7206 respectively available from Texas Instruments and Intersil FIG. 8 shows an alternative arrangement for tone signalling. In this case the keypad 162 is connected to an input port of microcomputer 190 which activates tone generator device 180 in dependence of receiving dialling input from the keypad or the wand 20.

An alternative form of coding to the 2-out-of-5 coding described thus far is hexadecimal coding, that is a coding to the base $16(2^4)$. This coding is much used in computer work and is readily expressed in terms of 4-bit bytes which in turn can be represented as bar codes. Hexadecimal represents a decimal numbers 0–15 and in conformity with conventional notation, 0 to 9 (decimal) are represented by the figures 0–9 (hexadecimal) respectively while 10–15 are represented by the letters A to F respectively. Numbers represented in hexadecimal (hex.) will be identified by the suffix (H).

Although only figures 0–9 are required for telephone numbers themselves, there is the advantage in adopting a coding system such as hexadecimal which provides additional numbers allowing additional facilities to be incorporated, particularly in the system now to be described which is implemented using a microcomputer.

Figure 9:
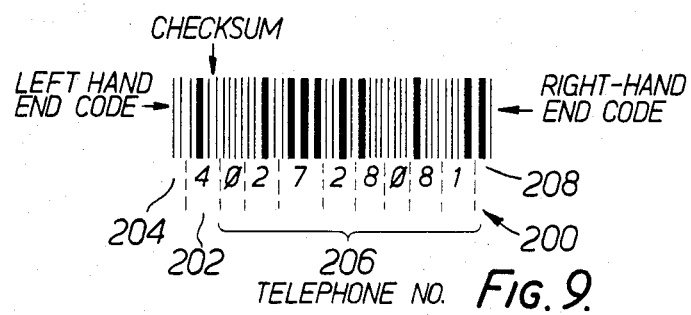
FIG. 9 is a representation of a bar-coded telephone number having a format using a hexadecimal-based coding.

FIG. 9 shows a telephone number 02728081 represented as a bar code 200 for reading with a wand as already described with reference to FIG. 3. The principles of reading and digitising the bar code are the same as before. A binary "1" is represented by a thick black bar: a "0" by a thin black bar, say a 3:1 thickness ratio with a light-colour (e.g. white) spacing in the form of representation shown.

A difference arises in processing the bits representing the number when the validation and decoding stages are reached-block 40 in FIG. 3 and the microcomputer (microprocessor) controlled sequence of FIG. 4. A 2-out-of-5 code contains an inherent figure-by-figure validation in its format. This is absent in the hex. equivalent. To overcome this and provide a check on a valid entered number, a "checksum" byte 202 is added between the left-hand end code 204 and the individual bar-coded figures of the telephone number which will be referred to as a whole as the digit field 206. The checksum byte is given a hex. value that makes the sum of the individual bytes of the digit field 206 and checksum byte 202 equal to zero (modulo 16). Thus the sum of the figures (decimal) of the digit field of FIG. 9 is $0+2+7+2+8+0+8+1=28$. 28 has a value of 12 (modulo 16), i.e $28/16=1$ remainder 12. The checksum byte needs a value of 4 to bring the total to 32 which has a value of zero (modulo 16). The bar code 200 is completed by the right-hand end code 208.

Further description of validation and decoding will be given with reference to the flow chart of FIG. 10. In fact no decoding is necessary in the sense it was with the 2-out-of-5 format. The individual figures are stored in the microprocessor memory in 4-bit hex. in which microprocessors customarily operate. Thus if the entered number is determined to be valid the extraction of individual 4-bit figures or groups of such figures for further processing is straight forward.

Figure 10:
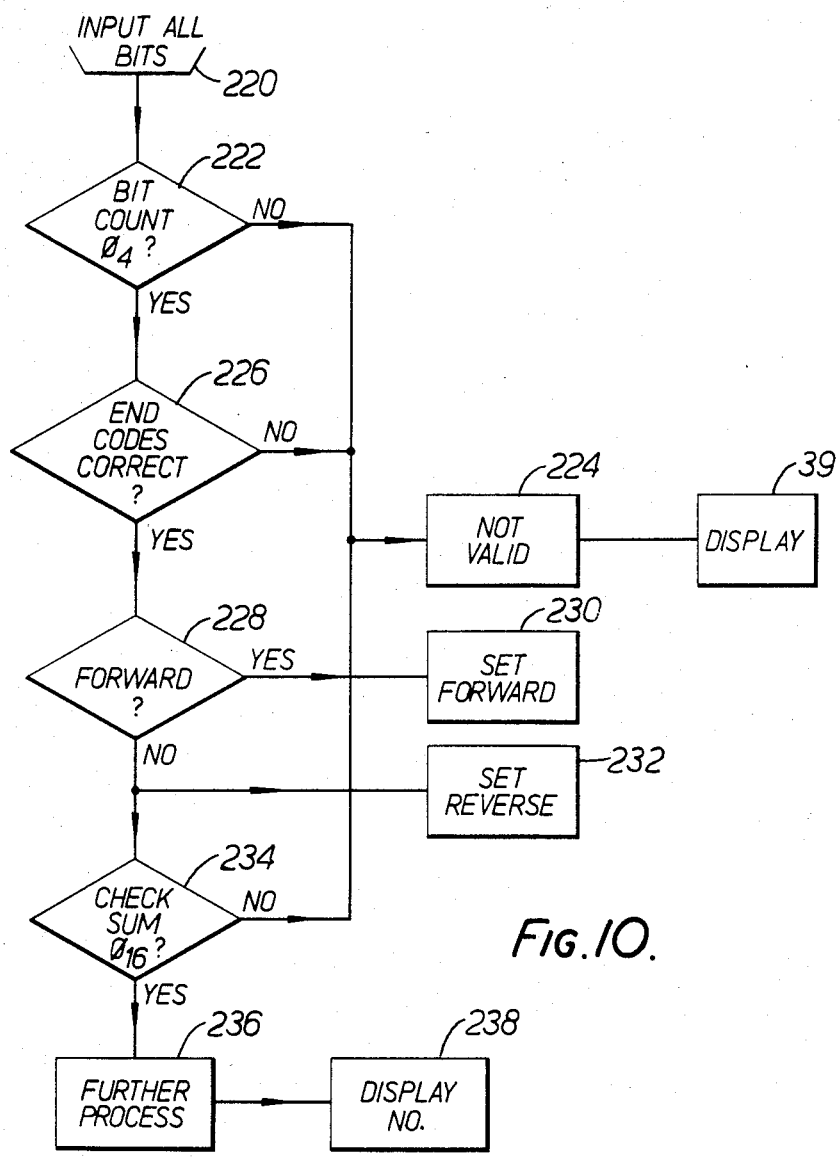
FIG. 10 is a flow chart which shows an input validation sequence for a number of the format shown in FIG. 9.

In contrast to the operating sequence of FIG. 4, in FIG. 10, step 220 shows that a whole entry is recorded in an allocated memory space for validation. It will be noted that the total number of bits received including the 2-bit end codes has a value 0 modulo 4 in a correct entry. By counting at step 222 the bits received, the first check is whether this condition is satisfied. If not, a non-valid entry flag 224 is set and an appropriate display made to the user, e.g. via display 39 of FIG. 3. If the bit count is satisfactory the end codes are detected, i.e. the two bits at either end are examined, at 226. In this case "00" and "10" are used for the left- and right-hand codes respectively and so there will be an end-code sequence 00 10 or 01 00. If the sequence is not a valid one the non-valid entry flag 224 is set and the user display activated. If the sequence is valid it determines at step 228 the order, forward or reverse, in which the entry was made and a forward or reverse flag 230 or 232 respectively is set.

The next validation step 234 is to sum the succession of 4-bit bytes constituted by the checksum byte 202 and digit field bytes 206. If the sum is not equal to 0 modulo 16, the non-valid flag 224 is set. Assuming the entry is valid the bytes of the digit field can be extracted for further processing 236. The position and order of the digit field in the memory space is known by reference to the set direction flag. The determination of the total number of bytes stored in memory and the extraction of them in the required sequence is done by employment of conventional procedures.

The read-out of the bytes for dialling may be done as previously described including the discarding of the local area code such as "0272" in the number shown in FIG. 9 which is for Bristol. Prior to dialling, the number could be displayed to the user as indicated at 238 to provide him with a visual check that the number is correct.

There will now be described how special functions can be implemented exploiting the hexadecimal coding. The need for special functions can arise where an organization wishes to have some degree of security or restriction as to numbers dialled out by employees or specified groups of employees. For example, it may be desirable to prevent the dialling of international numbers, or even numbers outside the local area code, by unauthorized personnel. Based on a microcomputer controlled arrangement such as illustrated in FIGS. 7 and 8, the microcomputer can be instructed in various ways as to numbers which may or may not be dialled. The control is exercised by individual telephones or extensions on a PBX which may each have a microcomputer controlled unit fitted thereto. In particular the arrangement of FIG. 8 enables the microcomputer to examine in accord with its programmed instructions dialled numbers, whether entered by the keypad or the wand, to ascertain whether they are allowed to be dialled from that extension. The instructions can only be entered via the wand.

Figure 11:
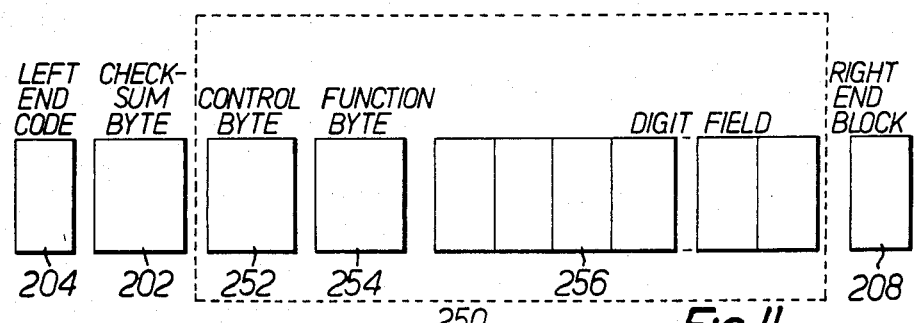
FIG. 11 shows the format of an instruction-containing bar code.

FIG. 11 shows a representation of the format of an instruction bar code 250. The hex. code bar details are not illustrated. Each code position is shown as a box. The instruction code contains left-hand and right-hand blocks 204 and 208 as before and adjacent the left-hand block in accord with the format of FIG. 9, there is a checksum byte 202. Next in sequence to the checksum position is a control byte position 252 and immediately following that is a function byte position 254. The control and function bytes are explained below. Following the function byte in a position immediately preceding the right-hand end code 208 (as in FIG. 9) is a digit field 256. As will become clear from the explanation of the control and function bytes, the digit field 256 is left blank for certain purposes and for convenience of layout and use can be omitted so that the right-hand end block is printed or otherwise reproduced adjacent the function byte.

The bytes of the digit field, if present, are restricted to the numbers 0-9 (H) and the checksum byte 202 may take any value from 0-F(H). The control byte is restricted to values in the range A to F (H) thereby enabling the presence of a control byte to be clearly distinguished from figures. The function byte may take a value in the range 0-F(H) but it is only present in combination with one or more selected control byte values. Thus a function byte of a value in the range 0-9 (H) can be distinguished from the digit field by its byte position immediately following a control byte having a value that requires a function byte to supplement it. Since upon receiving a sequence of bits derived from the wand, the microcomputer program will not initially know whether it is receiving a number to be dialled or an instruction for internal use, the same input procedure is required to be performable on both. The format of the instruction bar-code (FIG. 11) renders it suitable for the same validation procedure described with reference to FIG. 10. To implement the provision of special functions requires all entries to have their bytes read out in sequence from the left-hand block end, ignoring the checksum, i.e. read-out from byte position 2. Thus the extraction at step 236 in FIG. 10 is performed to this end. The further processing of the bytes is illustrated in the flow chart of FIG. 11 in which the bytes extracted to the right of the checksum byte (the bytes in the dashed-line rectangle) are shown as entering at 260. The chart shows the first step 262 to check whether the first byte received has a value in the range A-F (H). If so this byte is identified as a control byte (C-byte). The next step 264 shown separately for convenience is to decide whether the specific control byte has a value requiring a function byte (F-byte) to complete the instruction. If so the next byte is acted upon as the function byte as indicated at 266.

The next step 268 is to decide whether the instruction represented by the control byte alone or by the combination of control and function bytes is one requiring numerical information. If so, step 270 indicates that the next byte or bytes in sequence will be the relevant numerical data. The next byte will be the second or third byte depending on whether or not a function byte is required. The microcomputer then acts at step 272 to store the complete instruction represented by the instruction code at step 274 or in certain cases to first await a following instruction at step 276. This generalisation of the procedure may be better understood with reference to the examples given below.

Figure 12:
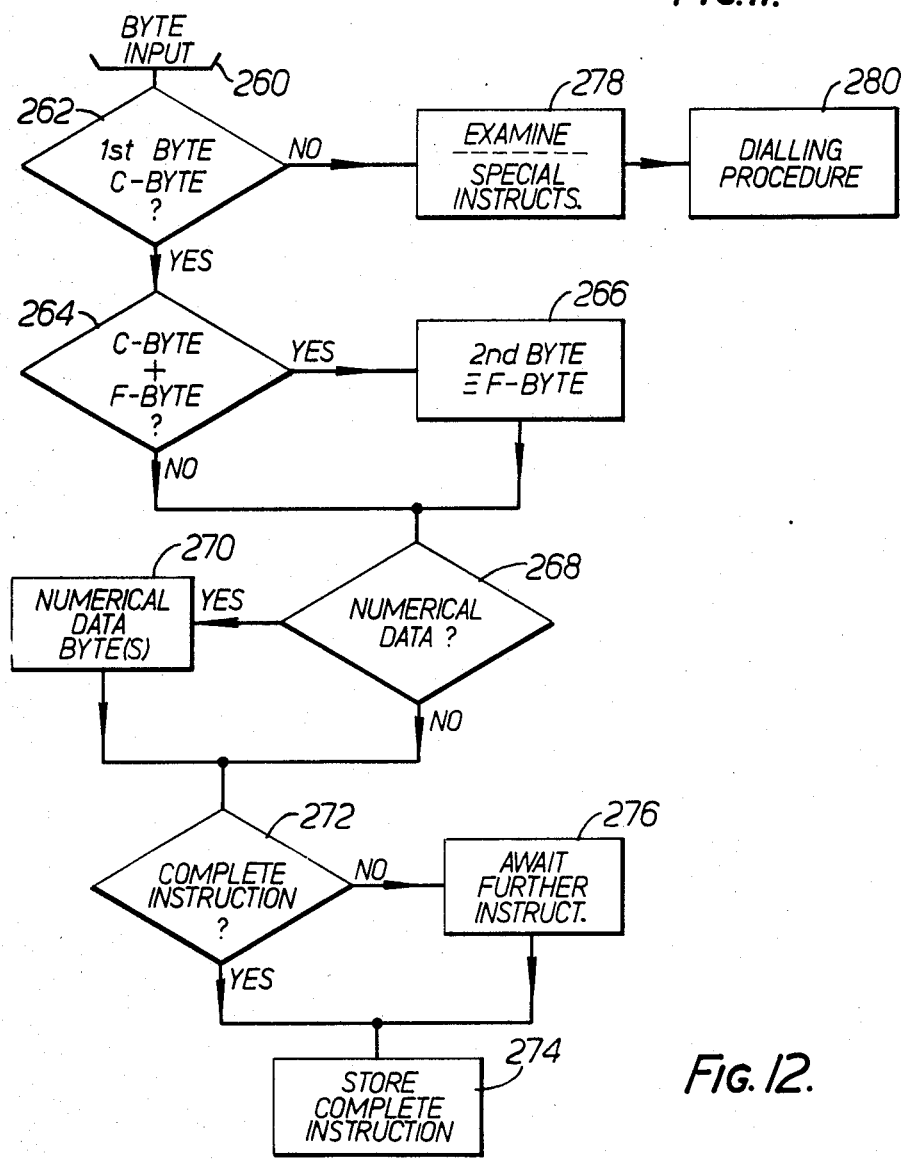
FIG. 12 shows a flow chart relating to the further processing of coded entries after validation.

If the first byte of the input sequence in FIG. 12 was not in the range A-F (H), then this is identified as an ordinary number sequence for dialling. The number is examined at step 278 in accord with any special instructions contained within the microcomputer as to allowable to non-allowable numbers. If allowable the number goes forward for dialling at step 280.

For example, referring to the United Kingdom, the dialling of any number beginning with "0" may be disabled (disallowed) except, possibly, for the local area dialling code which, if present, is to be stripped from the number before dialling. On the other hand dialling anywhere in the United Kingdom may be allowed but not international dialling. In this case, the examination procedure would look at the first three figures to ascertain if they were "010" and, if so, disable dialling.

Turning to special instructions in more detail, the following is by way of example. Clearly many schemes to suit various needs can be implemented. The table below shows the various combinations of control, function and digit field data which are used. The meaning of these combinations is given later. It is not intended, nor considered necessary, to explain in great detail the circumstances in which various functions are used. The explanation given here is to illustrate the sort of facilities that can be employed by the coding system and format taught herein.

TABLE

|     | C-byte | F-byte        | Digit Field      |
| --- | ------ | ------------- | ---------------- |
| (1) | A(H)   | φ-A(H)        | Empty (blank)    |
| (2) | B(H)   | φ-F(H)        | Telephone number |
| (3) | C(H)   | Empty (blank) | Single figure    |
| (4) | F(H)   | Empty (blank) | Telephone number |

It will be noted that the values D and E(H) are not used. Empty byte positions may be omitted in producing the relevant bar codes.

Looking at the table in more detail:

The control byte A(H) is always followed by a function byte. The function byte values represent the following instructions:

0(H)—local area code follows.
1(H)—disable (disallow) any telephone number beginning with "0".
2(H)—disable any telephone number beginning with "010".
3(H)—disable the following groups.
4(H)—enable (allow) the following groups.
5(H)—disable all grouped numbers.
6(H)—enable all grouped numbers.
7(H)—disable use of "pad".
8(H)—enable use of "pad".
9(H)—disable normal numbers.
A(H)—enable normal numbers.

Bytes 1, 2, 5, 6, 9 and A(H) are complete instructions. Bytes 0, 3 and 4(H) require all further instruction to follow. Bytes 7 and 8(H) concern a facility that will be further discussed below.

Byte 1(H) will prevent dialling of any number including an area or international code as would be required for calls outside the local area.

Byte 2(H) disables international dialling only. Bytes 5 and 6(H) are predicated on the basis that certain telephone numbers may be stored in the memory of the microcomputer and may be treated as a group as regards their allowability or disallowability for dialling. A group could include, for example, selected non-local numbers. Up to sixteen separate groups may be readily accommodated in the present system. Bytes 9 and A(H) could be used in the selective restriction of a particular extension to dialling internal extension numbers only.

Bytes 0, 3 and 4(H) are used in conjunction with byte 8(H). The "pad" referred to provides a means of reading in a local area code, e.g. 01; 0272 for London and Bristol respectively in the United Kingdom. As already mentioned, the pad itself is described later.

Turning now to control byte B(H) this is used to indicate that what follows in the digit field is a telephone number that is to be stored within the microcomputer memory and that it pertains to one of the groups already mentioned above. To this end the function byte contains the designation 0–F(H) of the group to which the number is to be allocated. This enables numbers to be stored in up to sixteen groups. The C(H) value of the control byte is used in conjunction with the entry of a single figure from the pad and is intended to indicate that just the one figure is to be expected.

Finally the control byte F(H) is used without a function byte to indicate that the complete telephone number present in the digit field is always to be available for dialling. For example, the emergency services number "999".

It will be apparent that in performing step 278 in FIG. 12 the microcomputer will first check whether a number entered falls within the final classification. The order in which the other enable/disable instructions are checked will depend on how many of the functions it is desired to implement the priority. Modern microprocessor devices are capable of operating so rapidly that no significant delay is apparent to the user.

The codes by the first line-control byte A(H)-of the above Table can be set out, as by printing, one by one on a suitable support medium with the appropriate labelling. As previously pointed out the bar codes may be printed on adhesive labels. Each code is set out with the format exemplified by FIG. 11 and in accord with the tabulated requirements. Codes formed according to the second and third line (control bytes B(H) and F(H)) can be likewise set out. The support media containing these codes would be made available only to authorized persons. Consequently the microcomputer of a telephone extension equipped as illustrated by FIG. 8 would be selectively instructable and those instructions would not be alterable by the ordinary user.

Figure 13:
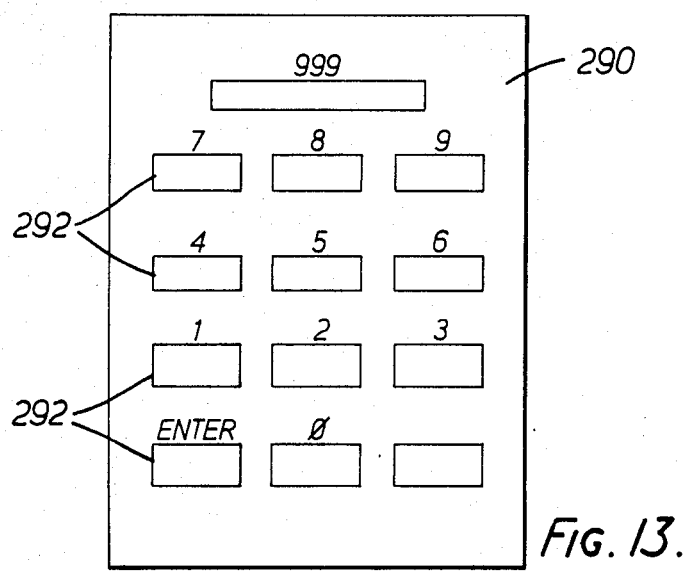
FIG. 13 shows a pad bearing bar-coded figures.
Figure 14:
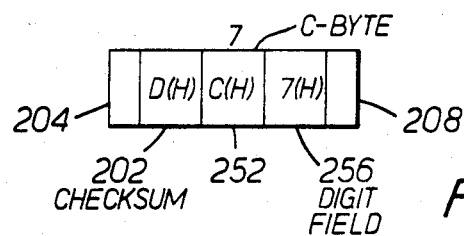
FIG. 14 shows the format of a coded single figure of the pad.

The pad that has already been mentioned may take the form illustrated in FIG. 13 in which a support medium 290 is shown as having a plurality of adhesive printed labels 292 adhered to it, the medium and labels being preferably overlain by a clear sheet for protection. The pad contains labels arranged rather as a keyboard for the values ∅ to 9 with another label for the ENTER or EXECUTE instruction. The support medium bears the appropriate legend adjacent each label. Each label is imprinted with the value of the associated number in a prescribed format. FIG. 14 shows a label to a larger scale to illustrate the format. The format is that discussed with reference to FIG. 11 using the instruction C(H) for the control byte 252. This byte is preceded by the lefthand end code 204 and checksum 252 respectively. There is no function byte and the control byte is followed by a single figure digit field 256 containing the relevant number—"7" as illustrated—in hexadecimal bar code. Finally the digit field is followed by the right-hand end code 208. Thus each number label of the same format with the appropriate figure coded is in the digit field and constitutes a complete entry when the wand is passed over it.

The microcomputer is programmed to hold the single figure entries until an entry instruction code is given. The ENTRY instruction can be given by having the enter label use the same format as the figure labels but having a specified hexadecimal code in the range A to F(H) which is a combination recognized as an ENTRY instruction.

The use of the pad may be further explained by assuming that, as already mentioned, there exist preprinted labels in accord with the sequence of instructions represented by the combination of control byte A(H) and the series of function bytes ∅ to A(H). For example, to enter the local area code the label for this function, which includes combination A(H)–∅(H), is used. Having scanned this label, the area code—say 0272 for Bristol—is entered by scanning in succession the labels corresponding to 0:2:7:2:ENTER (the colons are inserted to clearly separate the successive labels scanned). The ENTER at the end is an instruction that the particular operation is completed.

As another example, an initial instruction label might be that associated with groups so that the function byte position has the value 3 or 4(H). After scanning the coded group label, the pad is used to enter the number of the group, and the procedure terminated by an ENTER scan. The user will naturally think in terms of groups "10" to "15" rather than A(H) to F(H). Consequently, a group in the range "0" to "9" is selected by scanning the number label on the pad followed by ENTER. A group such as "14" is selected by scanning the 1:4:ENTER labels in that sequence the microcomputer translating this entry to E(H).

Figure 15:
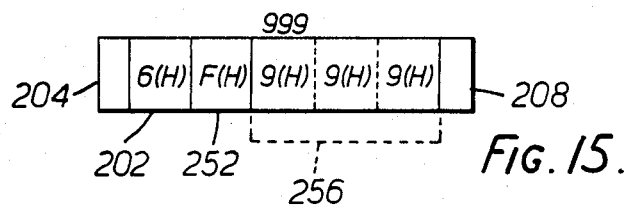
FIG. 15 illustrates other codes that may be associated with the pad.

Finally the pad may contain the emergency services number "999" that is always to be available for dialling. Its format (FIG. 15) is in accord with FIG. 11 containing in succession lefthand end code 204, checksum byte (value 6(H) in this case) 202, control byte F(H) 252, a three figure digit field 256 and the righthand end code block 208. The function byte 254 is not required in this case. A group number using the control byte B(H) would have a similar format but with the insertion of a function b te 254 between the control byte 252 and digit field 256 and the digit field would contain the full number.

All the use of the pad above described first requires the inputting of the pad enable code—control byte A(H) and function byte 8(H). A preprint of this code would be included in the list above-mentioned.

Figure 16:
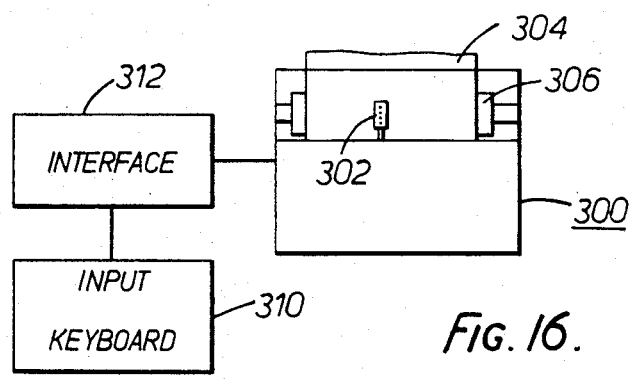
FIG. 16 illustrates apparatus for producing bar codes.

The production of adhesive labels for the pad, or the control instructions or for any ordinary numbers or any other bar-coded printed material may be done with the aid of a dot-matrix printer or a comb printer. For example, FIG. 16 diagrammatically shows a dot-matrix printer 300 with a head 302 traversing a printing medium 304 on a support platen 306. The dot-matrix head normally prints by selective actuation of a vertical array of needles in a multi-step transverse movement forming a single character. A column of seven needles is commonly used in a five step movement (7×5 array) though more array dot elements are often provided. A "0" value bar can be printed by means of actuating the whole needle array to form a line stroke character, that is the "0" bar. This provides a single vertical line that is continuous as far as the resolution of a scanning wand is concerned. A "1" value is printed by activating the needle array three times in immediate succession in a single character. The line strokes effectively merge in the transverse direction as seen by the optical head. The characters 0-9 and A-H are input from a keyboard 310. An interface 312 receives the character codes, e.g. in ASCII, and translates them to corresponding hexadecimal code or the keyboard could be specifically adapted to provide the characters already hexadecimally encoded. The interface contains the means to activate the printer head according to each hexadecimally coded input character. For a purpose-built printer this could be a cutomized ROM.

An alternative is a comb printer which comprises a line array (comb of electrodes) that is held stationary while the printing medium is moved beneath it, usually in steps. The end result is similar.

It will be appreciated that the needle array or comb could be substituted by any printing element activatable to print a line stroke.

The description given herein of the use of hexadecimal coding, instruction codes and related matters is primarily concerned with the inputting of data rather than dialling arrangements. The instructions described did not use the codes D or E(H) in the control byte. One of these codes could be used to aid dialling particularly where tone-dialling is used. In general tone-dialling is performed more quickly than pulse dialling. The latter normally provides adequate intervals for the telephone exchange to register and process the dialled number. It has been a practice with the faster tone-dialling to insert pauses in the number sequence to provide more processing time and to allow an exchange call-back feature in some cases. One pause may for example be inserted between an international code and the remainder of the number. Such a pause could actually be inserted in a coded number represented as in FIG. 11 by inserting say the unused value D(H) as an element in the digit field to represent a pause, or, to conserve space, a special bar width say four times the width of a "0" value bar, may be inserted. (This special bar would be excluded from any checksum calculation.)

The practice of the invention has been described in terms of the coding of telephone numbers by use of bar codes. As stated, these have the advantage that well established techniques and devices can be put into service in processing the bar code signals. However, it is visualized that other coding techniques are possible, particularly of a binary form. The principles of the apparatus of the invention could also be applied to the direct recognition of written or printed numbers in their normal form, using optical character recognition.

We claim:

1. Apparatus for dialling telephone numbers, comprising:
    means for inputting telephone numbers as a sequence of signals,
    a microprocessor and an associated digital memory connected to said inputting means for processing and storing numbers represented by signals entered by said inputting means,
    means connectable to a telephone line for outputting telephone numbers thereto as signals in a predetermined format, said output means being connected to said microprocessor to receive signals representing a stored number,
    means storing routines for controlling the operation of the microprocessor, and
    means for applying a signal to said microprocessor whereby the latter is controlled to detect whether a number stored in said digital memory has a predetermined characteristic and upon detection of such characteristic to inhibit the sending of the stored number signals to said output means.

2. Apparatus for dialling telephone numbers, comprising:
    means for inputting telephone numbers as a sequence of signals,
    a microprocessor and an associated digital memory connected to said inputting means for processing and storing numbers represented by signals entered by said inputting means,
    means connectable to a telephone line for outputting telephone numbers thereto as signals in a predetermined format, said output means being connected to said microprocessor to receive signals representing a stored number,
    means storing routines for controlling the operation of the microprocessor, and
    means for applying a signal to said microprocessor whereby the latter is controlled to detect whether a selected portion of a number stored in said digital memory has a predetermined characteristic and upon detection of such characteristic to strip said portion from the number and send signals representing the remainder of the stored number to said output means.

3. Apparatus for dialing telephone numbers, comprising:
    an input curcuit connectable to a bar code reader wand to receive a bar-coded telephone number contained between end codes indicating the start and end of the number, respectively, and connectable to a keypad for entry of a telephone number, the digits of the telephone number each being represented by a coded signal according to a code having more than ten code elements and ten elements of which are allocated respectively to the digits "0" to "9";
    a digital memory for storing the coded signals representing a telephone number received by said input circuit;
    means connectable to a telephone line for outputting a telephone number stored in said memory to the line as signals in a predetermined format;
    a microprocessor connected to the input circuit, digital memory and output means to control the transfer of a telephone number from said input circuit to said memory and the transfer of a stored telephone number from said memory to said output means; and
    means storing routines for controlling the operation of the microprocessor,
    said microprocessor being controlled by said routines to recognize an input signal that is an end code for use in determining the direction of a sequence of coded input signals associated with the end code, and to recognize an input signal that is not an end code and that is not one of said ten code elements to perform a function that does not involve the dialing of a telephone number.

4. Apparatus as claimed in claim 3 in which said microprocessor is controlled by said routines to recognize an input signal that is a predetermined code element that is not one of said ten code elements as an instruction to await a further input signal having a code element that lies in a range that includes said ten code elements, and to be responsive to such further input signal to perform an internal function that is determined by the code element of the further input signal.

5. Apparatus as claimed in claim 3 in which said microprocessor is controlled by said routines to recognize an input signal that is a predetermined code element that is not one of said code elements as an instruction to await at least one further input signal having code elements that include said ten code elements, and upon receipt of said at least one further input signal to store in said digital memory a number corresponding to the code elements of said at least one further input signal.

6. Apparatus as claimed in claim 5 in which said microprocessor is responsive to the recognition of said instruction code element to await a series of further input signals whose code elements represent a telephone number, and to store said number as a number that is to be available for dialing.

7. Apparatus as claimed in claim 3 further including a medium bearing a plurality of spaced bar code sequences readable with the aid of said wand, each bar code sequence being associated with the inputting of an instruction to the microprocessor to perform a function that does not involve dialing a telephone number and each bar code sequence including said end codes and intermediate said end codes at least one code element in bar code form that is not one of said ten code elements.

8. Apparatus as claimed in claim 7 in which said medium bears further spaced bar code sequences readable with the aid of said wand, each further bar code sequence being assocaited with the inputting of numerical data relating to the performance of an instructed function, each further bar code sequence comprising end codes intermediate which is at least one of said ten code elements in bar code form.

9. Apparatus for dialing telephone numbers, comprising:
an input circuit connectable to a bar code reader wand to receive a bar-coded telephone number contained between end codes indicating the start and end of the number, respectively, the digits of a telephone number each being represented by a coded signal according to a code having more than ten code elements and ten elements of which are allocated respectively to the digits "0" through "9";
a digital memory for storing the coded signals representing a telephone number received by said input circuit;
means connectable to a telephone line for outputting a telephone number stored in said memory to the line as signals in a predetermined format;
a microprocessor connected to the input circuit, digital memory and output means to control the transfer of a telephone number from said input circuit to said memory and the transfer of a stored telephone number from said memory to said output means;
means storing routines for controlling the operation of the microprocessor,
said microprocessor being controlled by said routines to recognize an input signal that is an end code for use in determining the direction of a sequence of coded input signals associated with the end code, and to recognize an input signal that is not an end code and that is not one of said ten code elements to perform a function that does not involve the dialing of a telephone number; and
a medium bearing a plurality of spaced bar code sequences readable with the aid of said wand and each relating to the inputting of an instruction to said microprocessor that does not involve the dialing of a telephone number, and each bar code sequence including said end codes and intermediate said end codes at least one code element in bar code form that is not one of said ten code elements.

10. Apparatus as claimed in claim 9 in which said medium bears further bar code sequences readable with the aid of a wand, each further bar code sequence associated with an inputting of numerical data relating to the performance of an instructed function, and each further bar code sequence including said end codes and intermediate said end codes at least one code element in bar coded form that is one of said ten code elements.

11. Apparatus as claimed in claim 10 in which said microprocessor is controlled by said stored routines to examine each string of input signals resulting from the reading of a bar code sequence, to perform the following steps:
(a) check for the correct presence of said end codes and, if present,
(b) examine with reference to the string direction indicated by said end codes a predetermined position in the string to ascertain if said string contains a code element at said position that is not one of said ten code elements; and
(c) if a code element that is not one of said ten code elements is present at said position, to perform a function that does not involve the dialing of a telephone number, and to treat the string as relating to a telephone number to be dialed when the code element at said position is one of said ten code elements.

12. Apparatus as claimed in claim 9 in which said microprocessor is controlled by said stored routines to examine each string of input signals resulting from the reading of a bar code sequence, to perform the following steps:
(a) check for the correct presence of said end codes and, if present,
(b) examine with reference to the string direction indicated by said end codes a predetermined position in the string to ascertain if said string contains a code element at said position that is not one of said tend code elements; and
(c) if a code element that is not one of said ten code elements is present at said position, to perform a function that does not involve the dialing of a telephone number, and to treat the string as relating to a telephone number to be dialed when the code element at said position is one of said ten code elements.

* * * * *